(12) United States Patent
Siciliano et al.

(10) Patent No.: US 6,209,693 B1
(45) Date of Patent: Apr. 3, 2001

(54) POWER LINE FOR AN ELECTRIC VEHICLE

(75) Inventors: Vito Siciliano, Pieve Ligure; Alcide Del Naja, Naples, both of (IT)

(73) Assignee: Ansaldo Trasporti S.p.A., Naples (IT)

( * ) Notice: Subject to any disclaimer, the term of this patent is extended or adjusted under 35 U.S.C. 154(b) by 0 days.

(21) Appl. No.: 09/367,647

(22) PCT Filed: Feb. 20, 1998

(86) PCT No.: PCT/IT98/00036

§ 371 Date: Dec. 13, 1999

§ 102(e) Date: Dec. 13, 1999

(87) PCT Pub. No.: WO98/36934

PCT Pub. Date: Aug. 27, 1998

(30) Foreign Application Priority Data

Feb. 21, 1997 (IT) ............................................ TO97A0151

(51) Int. Cl.[7] ...................................................... B60M 1/00
(52) U.S. Cl. .............................................................. 191/18
(58) Field of Search .................................. 191/1 A, 2, 6, 191/12 R, 14, 16, 17, 18, 19, 22 R, 23 R, 25

(56) References Cited

U.S. PATENT DOCUMENTS

| | | | |
|---|---|---|---|
| 4,057,753 | * | 11/1977 | Perry et al. ............................... 191/4 |
| 4,139,071 | * | 2/1979 | Tackett .................................. 180/2.1 |
| 4,836,344 | * | 6/1989 | Bolger .................................... 191/15 |
| 5,277,285 | * | 1/1994 | Musachio ................................. 191/6 |
| 5,810,136 | * | 9/1998 | Siciliano et al. ........................ 191/18 |

* cited by examiner

*Primary Examiner*—Mark T. Le
(74) *Attorney, Agent, or Firm*—Quarles & Brady LLP (57) ABSTRACT

A power line (1) wherein an elongated enclosure (4) houses a first and a second conducting line (27, 23), a striplike base portion (63) made of ferromagnetic material, an electric contact portion (71) superimposed on the base portion (63), and a releasable connecting device (64, 72) for connecting the base portion and the electric contact portion. The releasable connecting device (64, 72) permits disconnection of the striplike base portion (63) in the event a portion of the electric contact portion (71) remains in the raised position following extinction of the magnetic field, so that the base portion (63) drops down and establishes a short-circuit connection, indicating a malfunction, between the first and second conducting lines (27, 23).

14 Claims, 5 Drawing Sheets

POWER LINE FOR AN ELECTRIC VEHICLE

TECHNICAL FIELD

The present invention relates to a power line for an electric vehicle.

BACKGROUND ART

Power lines for electric vehicles—such as the one described in German Patent n°1.011.914 by Ludwig Reihardt, published on Jul. 11, 1957—are known to comprise an elongated insulating enclosure closed at the top by a number of conducting plates aligned in a straight direction and insulated from one another. The enclosure houses an elastically deformable conducting strip element made of ferromagnetic material, and which is attracted by the magnetic field generated by electromagnets to flex a portion of the conducting strip element towards the conducting plates to electrically supply at least one French Patent n° 1.151.382 by Jean-Florent DE BRUYN and José-Gaston DE BRUYN, published on Jan. 29, 1958, describes an electric vehicle current supply system comprising a hollow elongated insulating enclosure closed at the top by a number of conducting plates aligned in the traveling direction of the vehicle and separated by insulating elements interposed between adjacent conducting plates. The enclosure houses an elastically deformable conducting strip element extending in the traveling direction of the vehicle, and having a strip portion of ferromagnetic material on which is superimposed a strip portion of good electrically conducting material. The conducting element is attracted by the magnetic field generated by electromagnets on an electric vehicle to flex a portion of the conducting strip element towards the conducting plates to electrically supply at least one.

The power lines described in the above patents employ conducting strip elements comprising a layer of elastically deformable ferromagnetic material, possibly covered with a layer of good current conducting material (such as copper). In many operating conditions, known lines fail to provide for good mechanical and electric contact between the conducting strip element and conducting plates, so that, on account of the high current carried by the conducting strip element, electric arcs may be generated between the conducting strip element and conducting plates. Besides seriously damaging the conducting strip element, such arcs may even result in fusion of a portion of the plate and the conducting element, which may subsequently remain firmly connected to the conducting plate. When this occurs, the power line is totally unusable, by the conducting strip element being prevented from flexing along the line to supply other conducting plates, and the conducting plate to which the conducting element is fused remains permanently live, thus endangering the safety of anyone approaching the line. What is more, no provision is made on known power lines for means by which to detect the above condition.

DISCLOSURE OF INVENTION

It is an object of the present invention to provide a power line for an electric vehicle, designed to overcome the drawbacks of known lines.

According to the present invention, there is provided a power line of the type described in claim 1.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 2:
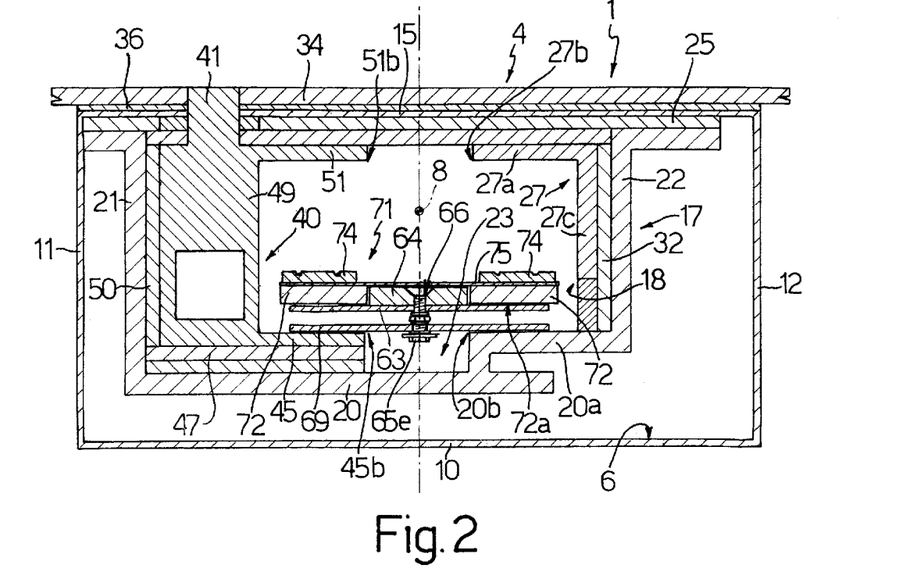
FIG. 2 shows a cross section of the power line along line II—II in FIG. 1.
Figure 3:
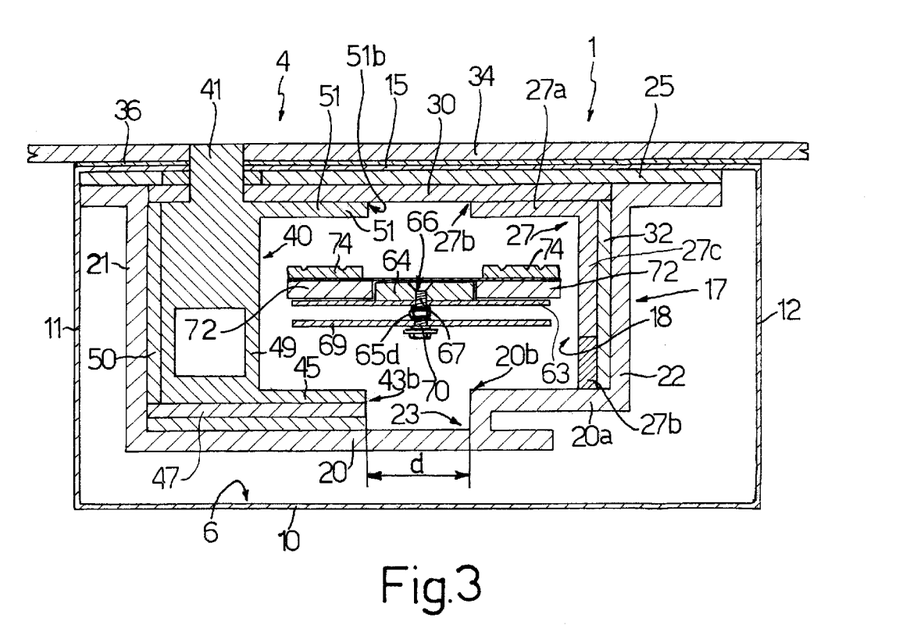
FIG. 3 shows a cross section of the power line along line III—III in FIG. 1.
Figure 4:
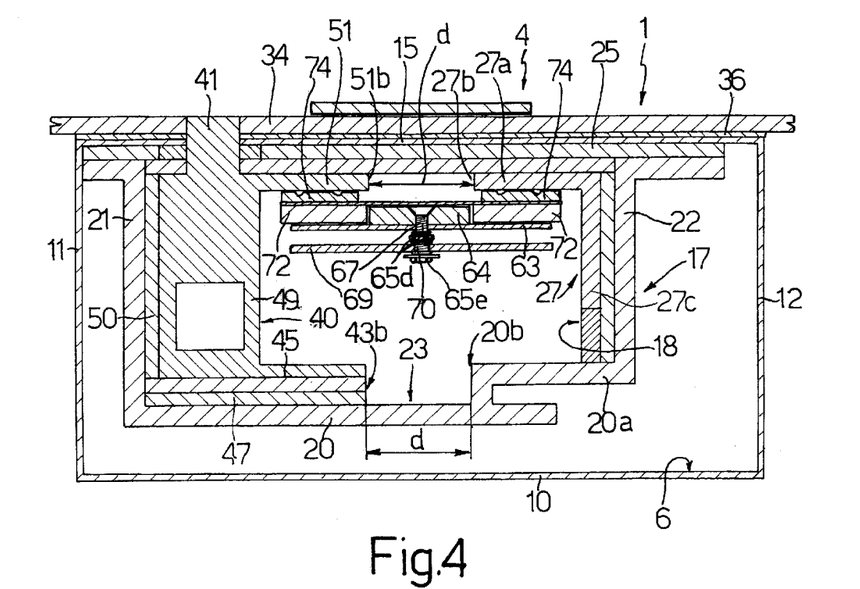
FIG. 4 shows a cross section of the power line along line IV—IV in FIG. 1.

With reference to FIGS. 2, 3 and 4, number 1 indicates as a whole a power line for an electric vehicle.

Power line 1 comprises a number of elongated insulating enclosures (modules) 4, each defining internally an elongated parallelepiped cavity 6 extending in a straight direction (along an axis) 8.

More specifically, each enclosure 4 is formed in one piece, and comprises a bottom horizontal insulating wall 10; two vertical lateral insulating walls 11, 12 perpendicular to wall 10; and a top horizontal insulating wall 15 parallel to and opposite bottom wall 10.

Enclosure 4 houses a metal conducting enclosure 17 defining internally an elongated parallelepiped cavity 18 extending along axis 8, and comprising a bottom wall 20 facing wall 10, two vertical lateral walls 21, 22 integral with and perpendicular to wall 20, and a flat top metal wall 25 contacting and fitted to wall 15 by fastening devices (not shown).

Enclosure 17 houses a first electric power conducting line 27 comprising a straight metal conducting element housed in a top portion of cavity 18 and separated electrically from adjacent metal walls 22 and 25. More specifically, conducting element 27 has a substantially L-shaped cross section, and comprises a flat horizontal first portion 27a adjacent and parallel to a flat insulating wall 30 underlying wall 25, and a flat vertical second portion 27c perpendicular to and integral with portion 27a and supported on a vertical insulating wall 32 parallel and adjacent to metal vertical wall 22.

Metal enclosure 17 defines a second electric power conducting line 23 extending substantially the whole length of insulating enclosure 4.

With reference to FIGS. 2, 3 and 4, power line 1 comprises a number of rectangular metal plates 34 outside enclosures 4.

More specifically, each plate 34 is fitted to top wall 15 via the interposition of a rubber sheet 36, is connected to enclosure 4 by fastening devices (not shown), and extends beyond the width of wall 15 so that end portions project from enclosure 4.

Power line 1 also comprises a number of insulating elements 37 (FIG. 1) located outside enclosures 4 and interposed between plates 34. More specifically, each insulating element 37 is interposed between and electrically separates two adjacent metal plates 34. Each metal plate 34 communicates with a respective electric feeder device 40 housed inside cavity 18 and connected to plate 34 by a respective electric conductor 41 extending through insulating wall 30, metal wall 25 (from which it is insulated), wall 15 of enclosure 4, and rubber sheet 36.

Feeder 40 substantially comprises a C-shaped metal wall in turn comprising a flat horizontal first portion 45 supported on an insulating wall 47 superimposed on metal bottom wall 20; a vertical second portion 49 facing and separated electrically from metal lateral wall 21 by an insulating wall 50; and a flat horizontal third portion 51 perpendicular to and integral with vertical portion 49 and contacting insulating wall 30.

Flat portions 51 and 45 are therefore parallel and face each other on opposite sides of cavity 18; and portions 51 and 45 of the various feeder devices 40 are spaced along axis 8 and the full length of enclosure 4 to respectively define first and second electric collectors for the purpose explained later on.

Flat portion 45 (second collector) is coplanar with a portion 20a of the second electric power line; and flat portion 45 and portion 20a are separated electrically and have respective parallel facing edges 45b and 20b separated by a distance d.

Flat portion 51 (first collector) is coplanar with portion 27a of the first electric power line; and flat portion 51 and portion 27a are separated electrically and have respective parallel facing edges 51b and 27b separated by a distance d.

Feeder device 40 also cooperates with a conducting strip element 60, which is housed inside cavity 18, extends the full length of enclosure 4, and, when in the rest position (FIG. 2), is substantially perpendicular to and symmetrical with a plane P perpendicular to wall 20. Conducting strip element 60 has opposite end portions 60e (FIG. 5) fitted to supporting and connecting devices 62 (described in detail later on) at opposite ends of enclosure 4.

According to the present invention, strip element 60 (FIG. 8) comprises a striplike base portion 63, which is defined by a flexible strip of ferromagnetic material, has a first elongated rectangular top face 63a and a second elongated rectangular bottom face 63b, and is of a width L greater than distance d between facing edges 45b and 20b. Strip element 60 also comprises a central retaining element 64 defined by an elongated section extending along the full length of striplike base portion 63 and made of flexible insulating material (e.g. plastic). More specifically, section 64 has a rectangular cross section, is positioned with one of its base walls—corresponding to a long side of the rectangular cross section—contacting face 63a, and has elongated lateral walls 64a, 64b—corresponding to the short sides of the rectangular cross section—equidistant from the straight long edges 63', 63" of striplike portion 63.

Figure 8:
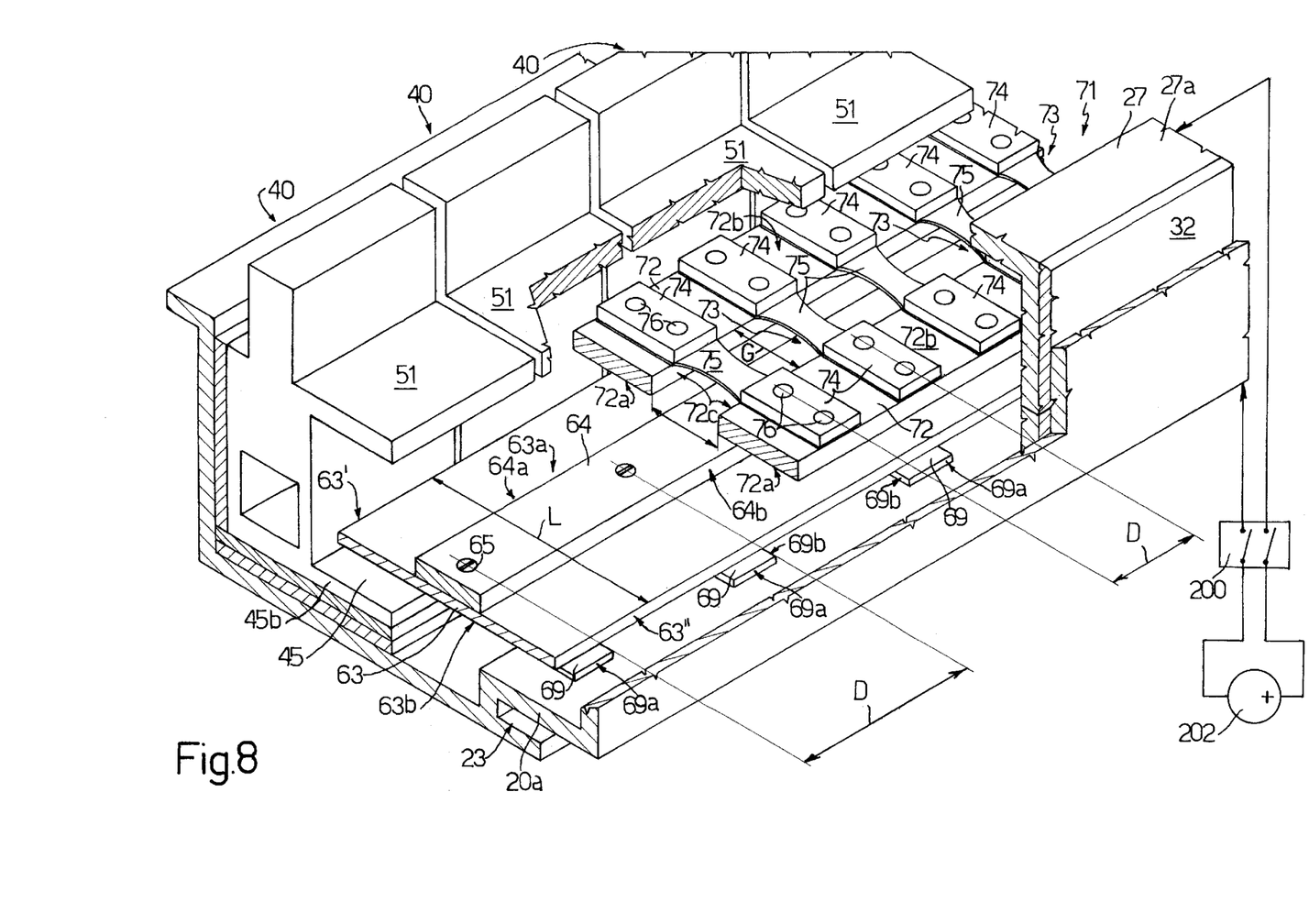
FIG. 8 shows an exploded view in perspective of a second detail of the FIG. 1 line.

Section 64 is connected firmly to striplike base portion 63 by insulating screws 65 (e.g. made of plastic) aligned along section 64 (and therefore along strip element 60), and which, in the embodiment shown, are, but not necessarily, equally spaced with a spacing D. More specifically, each screw 65 extends through section 64, and comprises a truncated-cone-shaped head portion housed inside a flared portion of a through hole 66 formed in section 64, and a threaded shank portion which projects from hole 66 to engage a through hole 67 formed in base portion 63 and coaxial with hole 66. The shank portion projecting from face 63b is engaged by a nut 65d, which presses on striplike portion 63 to connect the parts together.

Each insulating screw 65 supports a flat rectangular metal (e.g. copper) element 69 facing face 63b in a plane substantially parallel to the plane of undeformed striplike portion 63 Each element 69 has short edges 69a parallel to edges 63', 63", and long edges 69b of a length equal to width L.

More specifically, each flat rectangular element 69 has a central through hole 70 housing the shank portion projecting from nut 65d; and the shank portion projecting from hole 70 is fitted with a second nut 65e for securing element 69 to screw 65. The distance between nuts 65d and 65e is greater than the thickness of element 69, which is thus allowed a limited amount of positioning movement with respect to portion 63. A short coil spring (not shown) may also be fitted coaxially with screw 65, with opposite end portions resting respectively on nut 65d and on the face of element 69 facing face 63b, to form an elastic supporting device for positioning element 69.

Given said spacing of screws 65, elements 69 are equally spaced along strip element 60 with a spacing substantially equal to spacing D; and spacing D is also substantially equal to the distance, measured in a direction parallel to axis 8, between central portions of adjacent flat horizontal portions 45.

Strip element 60 also comprises an electric contact portion 71 carried releasably by the striplike base portion, and in turn comprising a pair of parallel elongated sections 72 made of flexible insulating material (in particular, plastic) and connected to each other by conducting bridge elements 73 for the purpose described later on. More specifically, each section 72 has a rectangular cross section, and is defined by a rectangular bottom wall 72a (corresponding to a first long side of the rectangular cross section) facing face 63a; by a rectangular top wall 72b facing wall 30 and corresponding to a second long side of the rectangular cross section; and by a pair of opposite rectangular lateral walls 72c corresponding to the short sides of the rectangular cross section. The facing rectangular walls 72c of the two elongated sections 72 are separated by a constant distance G substantially equal to (or slightly greater than) the width of section 64; and the thickness of elongated sections 72 is substantially equal to that of section 64.

Each conducting bridge element 73 comprises a pair of rectangular metal (e.g. copper) pads 74 joined by a straight conducting element 75 (e.g. defined by a flat copper blade), which extends between and bridges pads 74, and has a smaller-section central portion. The pads 74 of each bridge element 73 are superimposed on respective walls 72b of sections 72, and are secured firmly to sections 72 by screws 76; and conducting bridge elements 73 are, but not necessarily, equally spaced with a spacing P smaller than spacing D. In the embodiment shown, conducting bridge elements 73 also provide for mechanically connecting and keeping sections 72 separate and parallel to each other. The mechanical connecting function, however, may obviously be performed by bridge elements made of plastic material and extending between sections 72, in which case, conducting bridge elements 73 would provide solely for performing the fuse function described later on.

In a mating position (shown in FIG. 2), electric contact portion 71 mates with, and rests by force of gravity on, striplike base portion 63. More specifically, in the mating position, sections 72 are positioned with respective walls 72a contacting face 63a of striplike base portion 63 and on opposite sides of section 64, the lateral walls 64a, 64b of which are adjacent to respective lateral walls 72c of sections 72. Elongated section 64 (secured firmly to striplike base portion 63) is therefore interposed between the two elongated sections 72, which are firmly secured to each other by the conducting bridge elements extending crosswise to elongated sections 72; and the transverse restraint defined by walls 72c contacting walls 64a, 64b prevents electric contact portion 71 from moving transversely with respect to striplike base portion 63. More specifically, the flexible central elongated section 64 defines a first retaining device, which mates with a second retaining device defined by the two flexible elongated lateral sections 72, which rest on striplike base portion 63, on opposite sides of elongated central section 64, and with the lateral walls of central section 64 contacting the facing walls of lateral sections 72, to prevent electric contact portion 71 from moving transversely with respect to strip element 60.

Each insulating enclosure 4 is provided, at two opposite end portions, with respective supporting and connecting devices 62, each of which provides for supporting an end portion 60e of conducting strip element 60, while at the same time enabling end portion 60e to move up and down.

Each device 62 comprises a rectangular elastic accordionlike wall 100 having, in cross section, an undulated profile, and comprising an elastic peripheral lip 102, which is fitted and secured firmly, e.g. by means of adhesive, to the peripheral end edges 4' of elongated parallelepiped enclosure 4.

Device 62 thus closes a respective end opening of enclosure 4 to prevent any external agents entering cavities 6 and 18.

Each end portion 60e of conducting element 60 is defined by a respective rectangular end portion 63e of striplike base portion 63, which rectangular end portion 63e is narrower than width L.

Figure 6:
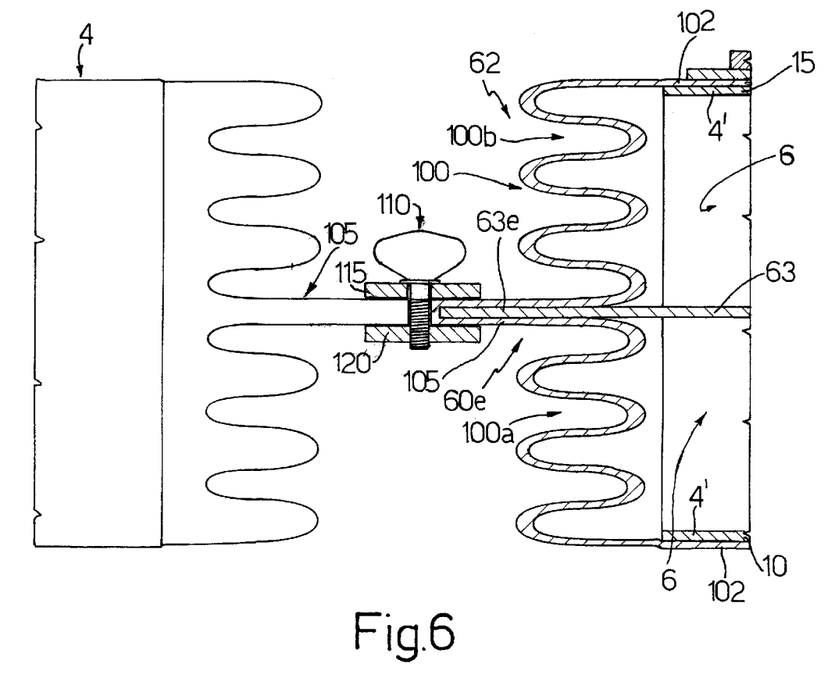
FIG. 6 shows a longitudinal section of a first detail of the FIG. 1 power line.
Figure 7:
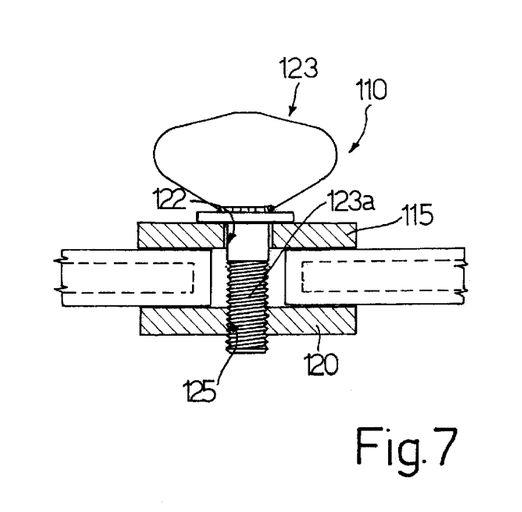
FIG. 7 shows a larger-scale cross section of an element in FIG. 6.

End portion 63e projects from metal enclosure 17 (FIG. 6), and is housed inside a pocket 105 defined by a hollow parallelepiped appendix extending outwards of enclosure 4 from wall 100 and open on the side facing cavities 6 and 18. Pocket 105 is located approximately at a central portion of wall 100, so that a first number of undulated portions 100a are located between pocket 105 and bottom wall 10, and a second number of undulated portions 100b are located between pocket 105 and top wall 15. supporting and connecting device 62 also provides for connecting the conducting strip elements 60 of different insulating enclosures 4; for which purpose (FIG. 6), the end portions of insulating enclosures 4 are positioned facing each other, with parallelepiped appendixes 105 aligned and also positioned with end portions facing each other. Each parallelepiped appendix 105 (and the respective end portion 63e housed in it) is connected to the parallelepiped appendix 105 (and respective end portion 63e housed in it) of the other enclosure by means of a bridging device 110. More specifically, bridging device 110 (FIG. 7) comprises a rectangular plate 115 with two rectangular wings (not shown) extending along the long sides of plate 115; and a rectangular plate 120, which is positioned facing and parallel to plate 115, with its own long edges between the wings of plate 115. Plate 115 also has a central hole 122 for housing the threaded shank 123a of a screw 123, which screws into a threaded central hole 125 formed in plate 120. Parallelepiped appendixes 105 are conveniently interposed between plates 115 and 120 and on opposite sides of screw 123, which is screwed into hole 125 to bring plates 115 and 120 closer together, to compress parallelepiped appendixes 105 between the plates, and to connect end portions 63e housed in respective appendixes 105.

In actual use, power line 1 is formed by aligning a number of enclosures 4 next to one another in a straight vehicle traveling direction; each pair of adjacent end portions 60e is connected mechanically, as described, using bridging device 110 to form an overall strip element extending the full length of line 1 and defined by the conducting strip elements 60 of the various connected enclosures 4; and electric lines 27 and 23 of one enclosure are connected electrically to the corresponding electric lines of the adjacent enclosure by means of external connecting cables (not shown)

Purely by way of example, line 1 may be laid between the rails (not shown) of a railroad line (not shown), with enclosures 4 housed inside a parallelepiped seat in the ballast (not shown). When so laid, plates 34 face upwards and are substantially coplanar with the rails (not shown). Power line 23 is conveniently connected to a ground potential, while power line 27 is connected to a positive supply potential.

Power line 1 is used in conjunction with an electric vehicle, for example, a railroad vehicle 80 (shown schematically in FIG. 1) traveling along the railroad line (not shown).

Figure 1:
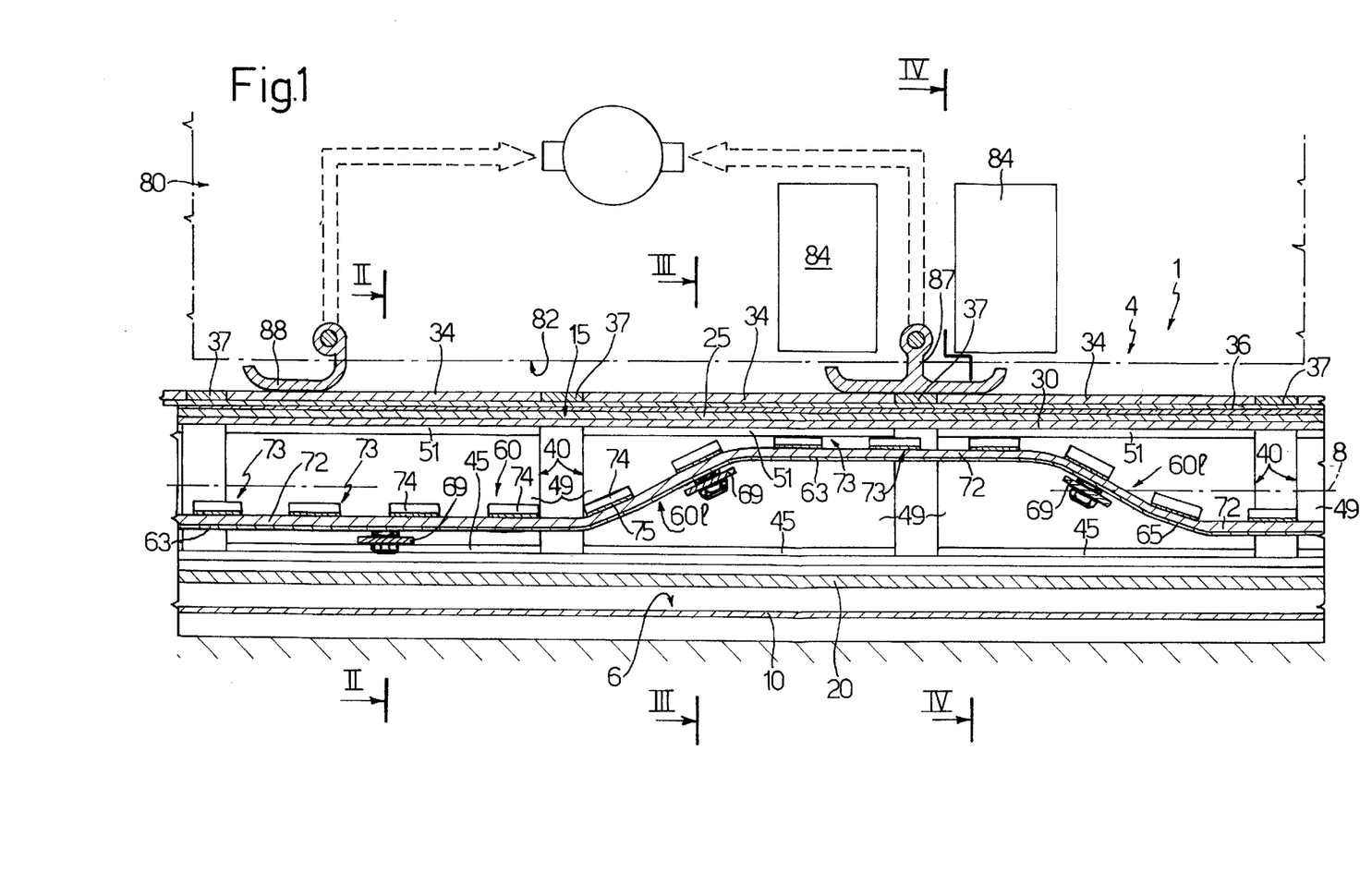
FIG. 1 shows a longitudinal section of a power line for an electric vehicle in accordance with the teachings of the present invention.

Electric vehicle 80 has a central portion defined by a floor 82 facing and parallel to plates 34, and comprises, internally, a pair of electromagnets (or permanent magnets) 84 for generating a magnetic field from floor 82 towards enclosures 4.

When power line 1 is not engaged by electric vehicle 80, conducting element 60 is in a rest position (FIG. 2) in which it is substantially undeformed and parallel to bottom wall 20.

More specifically, in the rest position (FIG. 2), striplike base portion 63 is substantially undeformed and coplanar with a plane substantially parallel to bottom wall 20; elongated sections 72 carried by striplike base portion 63 are also substantially undeformed and lie in a plane parallel to bottom wall 20; and each flat rectangular element 69 has a first end contacting portion 20a of power line 23, and a second end on flat portion 45 of a respective feeder 40, so that each element 69 defines an electric bridge connection between portion 20a of power line 23 and a respective flat portion 45 of a feeder 40. Given the spacing between elements 69, which, as stated, is substantially equal to the distance between adjacent feeders 40, an electric connection is established between flat portions 45 and bottom wall 20 (line 23) and therefore between all the feeder devices 40 (and plates 34) and power line 23 when conducting strip element 60 is in said rest position.

When conducting strip element 60 is in the rest position, plates 34 are therefore all connected to ground potential. Line 1 is therefore intrinsically insulated, in that all the outer parts (plates 34) are at ground potential, and the live parts (lines 27) are housed inside insulating enclosures 4 (high degree of insulation of line 1) and inside metal enclosures 17 (high degree of shielding of line 1). In the rest position, (positive) electric power line 27 is in fact insulated from all the other metal parts of line 1 and housed inside metal enclosure 17. In particular, line 27 is insulated and separated physically from contact portion 71 and portion 51 (first collector).

The area of each flat rectangular element 69 is much smaller than the overall area of face 63b, so that the weight of the stratified structure defined by striplike base portion 63 and by contact portion 71 superimposed on portion 63 is discharged entirely on to elements 69, which therefore exert considerable pressure on portion 20a and flat portions 45 to ensure good electric contact between the parts.

When power line 1 is engaged by electric vehicle 80 and electromagnets 84 are active, a magnetic force of attraction is generated by the interaction between the field of electromagnets 84 and striplike base portion 63, so that the portion of striplike base portion 63 affected by the magnetic force of attraction is drawn and flexed upwards into an arc towards electromagnets 84, and the arcing of striplike base portion 63 is transmitted to elongated sections 72, which, being made of flexible plastic material, are flexed to reproduce the same curvature as the underlying striplike base portion 63.

As shown clearly in FIGS. 1, 3 and 4, electric contact portion 71 and the underlying striplike base portion 63 affected by the force of attraction are both drawn upwards into the shape of an arc towards wall 25.

More specifically, the portion of electric contact portion 71 beneath electromagnets 84 moves into an activated position in which sections 72 are adjacent to insulating wall 30 (FIGS. 1 and 4) with at least one conducting bridge element 73 contacting portion 27a of first power line 27 and at least one first collector 51. An electric bridge connection is thus established, via conducting element 73, between first power line 27 and first collector 51, and therefore between line 27 and a plate 34. Each conducting bridge element 73 in fact is of a width L greater than the distance d between the adjacent edges 51b and 27b of the contact portions of first collectors 51 and first conducting line 27.

In the FIG. 1 embodiment, the shape and arrangement of electromagnets 84 are such that three adjacent bridge elements 73 contact first collectors 51 of two adjacent feeder devices 40, so that two adjacent (live) plates 34 are connected to positive power line 27. The flat elements 69 of the deformed portion of conducting element 60 are lifted off underlying portion 20a of power line 23 and flat portions 45, so that the live plates are disconnected from negative power line 23.

As the vehicle, and the electromagnets carried by it, travel along power line 1, the formerly attracted portion of the conducting element is no longer subjected to any force of attraction, so that striplike base portion 63, together with superimposed contact portion 71, drops down by force of gravity (i.e. towards wall 20).

The electric contact formerly established by conducting bridge elements 73 between first power line 27 and the first collector 51 of a feeder device 40 is therefore broken, and electric contact is established between power line 23 and the second collector of the same feeder device 40.

Figure 5:
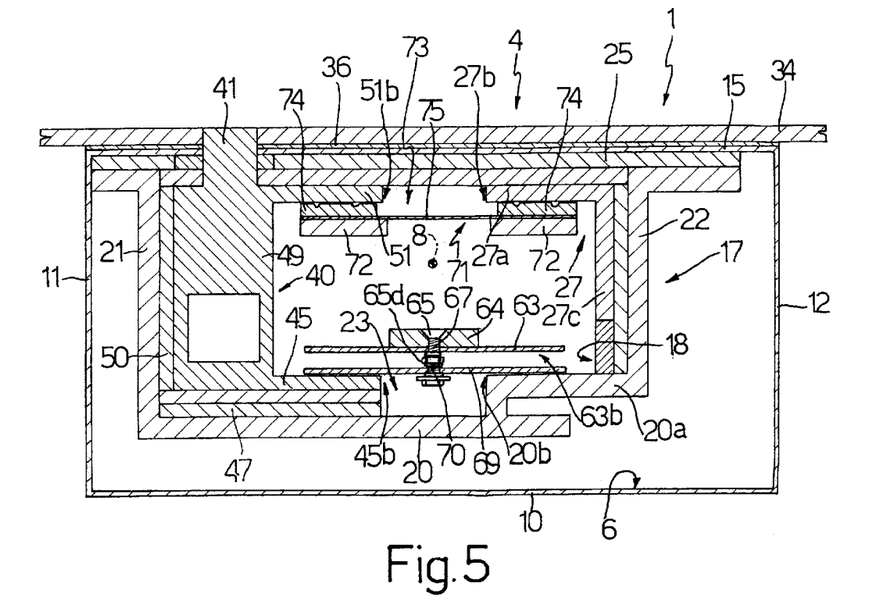
FIG. 5 shows a cross section of FIG. 3 in a different operating condition.

In the event an electric arc, generated between a conducting bridge element 73 and first power line 27 and/or first collector 51, causes at least one conducting bridge element 73 to be firmly connected (by a fused metal portion) to first power line 27 or first collector 51, the conducting bridge element 73 cannot be disconnected from first power line 27 or first collector 51 even when the force of magnetic attraction is extinguished (FIG. 5). In which case, the arced portion of contact portion 71 remains in the raised position, firmly connected to first collector 51 and line 27, while the striplike base portion formerly connected to the arced portion of contact portion 71 drops down by force of gravity off contact portion 71. Striplike base portion 63 and the arced portion of contact portion 71 are disconnected immediately by the striplike base portion, as it falls, withdrawing central retaining element 64 from the gap between the two elongated sections of electric contact portion 71. The falling striplike base portion 63 comes to rest with a flat rectangular element 69 contacting portion 20a of power line 23 and flat portion 45; in which position, the same feeder 40 is connected simultaneously to positive electric power line 27 and negative electric line 23, thus causing a short-circuit between lines 23 and 27. According to the present invention, the malfunction caused by a portion of contact portion 71 remaining permanently in the raised position is immediately indicated by the short-circuit generated by the malfunction when the magnetic force of attraction at that particular portion is extinguished. Power line 1 according to the present invention is also connected to a known safety switch 200 (shown schematically), which is connected at the input to a direct-voltage source 202, e.g. a rectifying bridge for rectifying an alternating voltage, has outputs connected respectively to line 23 and line 27, and provides for immediately disconnecting voltage source 202 from power line 1 in the event of excessive current absorption resulting from the above short-circuit. If safety switch 200 fails to operate (e.g. due to a fault on the switch), the high short-circuit current flows through at least one conducting bridge element 73, which, as stated, comprises an element 75 with a small-section central portion defining a fuse portion, which is heated rapidly by the high short-circuit current, and melts rapidly (e.g. in a few hundredths of a second) to disconnect electric lines 23 and 27, and at any rate to disconnect the formerly live plate 34 from positive electric line 27. Even without the aid of safety switch 200, power is therefore cut off to the conducting plate 34 formerly supplied as a result of the above malfunction.

Electric vehicle 80 comprises at least a first pickup device 87 (FIG. 1) located beneath floor 82, near electromagnets 84, to mate with live plates 34 and supply positive electric power to run electric vehicle 80.

The portions of conducting strip element 60 adjacent to the arced portion are inclined with respect to the arced portion and slant downwards by force of gravity towards wall 10. The inclined portions 601 are spaced and physically separated from first collector 51 and second collector 45 (FIG. 3), and are also spaced and separated from first power line 27 and second power line 23 (FIG. 3).

The inclined portions 601 end when a first element 69 comes to rest on bottom wall 20 of second conducting line 23 and on a second collector 45 of a feeder device 40, so that all the plates 34 of line 1 which are not live are connected to conducting line 23.

Electric vehicle 80 also comprises at least a second pickup device 88 (FIG. 1) located, in the embodiment shown, beneath floor 82, behind/in front of electromagnets 84 and coaxial with the traveling direction of the electric vehicle. Pickup device 88 mates with a plate 34 connected to line 23, and supplies negative electric power by which to run electric vehicle 80. If negative electric power is supplied by an external negative electric line (not shown), e.g. defined by a metal electric conductor (not shown) extending to one side of plates 34, second pickup device 88 is located beneath floor 82 and to one side respect to the traveling direction of the electric vehicle through the center of adjacent plates 34.

As electric vehicle 80 travels along, successive portions of strip element 60 are deformed, and the arced portion, following the motion of the electric vehicle, moves along the various enclosures 4 forming part of line 1, so that the arced portion of conducting strip element 60 travels wavelike along line 1, from one end to the other of each enclosure 4, and, on reaching the end portion of one enclosure 4, moves to the end portion of the adjacent enclosure 4.

Bridging device 110 provides for rigidly connecting the opposite end portions 60e of conducting strip elements 60 in adjacent enclosures 4 of modular line 1, so that, as the arced portion of strip element 60 reaches the end portion of one enclosure 4, the end portion of the strip element of the next enclosure 4 is automatically flexed upwards, and the arced portion travels wavelike along the adjacent enclosures 4.

The many advantages of the strip element 60 according to the teachings of the present invention may be summarized as follows:

strip element 60, together with safety switch 200, provides (by short-circuiting the line) for immediately indicating the malfunction resulting from a portion of the strip element remaining permanently in the raised position;

besides indicating the malfunction, the strip element also contributes directly towards cutting off power to the live plate by cutting off the fuse element 75;

the strong pressure exerted by elements 69 on bottom wall 20 of second conducting line 23 and on second collectors 45 of feeder devices 40 ensures effective electric connection of the parts for negatively supplying plates 34.

Moreover, line 1 is also so designed that all the external conducting parts (plates 34) of power line 1 are normally connected to ground potential (power conducting line 23) when line 1 is not engaged by the electric vehicle. Plates 34 are only connected to power line 27 (e.g. to a positive supply potential) when power line 1 is engaged by electric vehicle 80; and, what is more, the live plates 34 are located underneath the electric vehicle and therefore inaccessible.

Power line 1 is therefore intrinsically extremely safe (having no permanently live parts) and may even be located in places accessible to vehicle users and personnel.

Moreover, line 1 comprises an extremely straightforward, reliable electromechanical structure, involves no complicated drive circuits, and is easy to produce and cheap to service. Once drawn upwards, conducting strip element 60 of line 1 need simply be maintained in the raised attracted position, with no other operations required to synchronize supply of plates 34. Finally, when not engaged by the electric vehicle, power line 1 draws no current.

What is claimed is:

1. A power line for an electric vehicle, comprising:
    a number of conducting elements (34) arranged in a traveling direction (8) of the electric vehicle (80) and separated electrically from one another;
    a first conducting line (27) supplied with a first polarity;
    a second conducting line (23) supplied with a second polarity;
    at least one strip element (60) extending in said traveling direction (8) along substantially the whole length of the power line; and
    an elongated enclosure (4) housing said strip element (60) and said first and second conducting lines (27, 23);
    characterized in that said strip element comprises:
        a striplike base portion (63) made at least partly of ferromagnetic material;
        an electric contact portion (71) at least partly superimposed on said striplike base portion (63); and
        releasable connecting means (64, 72) interposed between said striplike base portion (63) and said electric contact portion (71);
        said striplike base portion (63) normally being positioned by force of gravity in a lowered rest position in which said striplike base portion (63) is substantially undeformed, and an electric connection (45, 69, 20a) is established between said second conducting line (23) and said conducting elements (34);
        said striplike base portion (63) being elastically deformable, and interacting with a magnetic field generated by excitation means (84) carried by said electric vehicle (80) to attract at least a portion of said striplike base portion (63) and of the electric contact portion (71) connected to and superimposed (64, 72) on the striplike base portion into a raised electric contact position in which an electric connection (51, 74, 75, 27a) is established between said first conducting line (27) and at least one said conducting element (34) via said electric contact portion (71);
        said releasable connecting means (64, 72) allowing said striplike base portion (63) to be disconnected by force of gravity from said electric contact portion (71) in an event a portion of said electric contact portion (71) remains in said raised electric contact position when said magnetic field is extinguished, so that the portion of the striplike base portion (63) formerly in the raised electric contact position drops into said lowered rest position, and, on reaching said lowered rest position, connects at least one conducting element simultaneously to said first (27) and second (23) conducting lines to produce a short-circuit, indicating a malfunction, between said first and second conducting lines (27, 23).

2. A line as claimed in claim 1, characterized in that said electric contact portion (71) carries a number of conducting bridge elements (73) electrically separated from one another and spaced along said strip element (60); at least one said conducting bridge element (73) of the portion of the electric contact portion in the raised electric contact position establishing, singly or in combination with other said conducting bridge elements (73), an electric connection between said first conducting line (27) and at least one said conducting element (34).

3. A line as claimed in claim 2, characterized in that said each conducting bridge element (73) comprises a conducting portion of predetermined section (75) defining a fuse element; said conducting portion of predetermined section (75) interrupting its own electric continuity in an event the current carried by the conducting bridge element (73) exceeds a threshold value.

4. A line as claimed in claim 3, characterized in that said releasable connecting means comprise:
    first retaining means (64) carried by said striplike base portion (63); and
    second retaining means (72) forming part of said electric contact portion (71) and in turn comprising at least one base portion (72a) positioned by force of gravity on said striplike base portion (63), and at least one lateral portion (72c) which interferes with said first retaining means (64) to prevent the electric contact portion (71) from moving in directions crosswise to said strip element (60).

5. A line as claimed in claim 4, characterized in that said first retaining means comprise a flexible central elongated section element (64) extending along said striplike base portion (63);
    said second retaining means comprising a pair of flexible elongated lateral section elements (72) connected by interconnecting means (73) stably interconnecting said pair of lateral section elements (72); said interconnecting means (73) also laterally spacing said lateral section elements (72) which extend substantially parallel to each other;
    said lateral section elements (72) resting on said striplike base portion (63), on opposite sides of said central elongated section element (64), so that lateral walls of said central elongated section element (64) contact facing walls of said lateral section elements (72) to prevent the electric contact portion (71) from moving transversely in directions crosswise to said strip element (60).

6. A line as claimed in claim 5, characterized in that said interconnecting means (73) comprise said conducting bridge elements (73).

7. A line as claimed in claim 6, characterized in that each said conducting element (34) communicates electrically (41) with first collector means (51) and with second collector means (45) housed in a cavity (6, 18) of said enclosure (4);

said cavity (6, 18) also housing said first conducting line (27) and said second conducting line (23) separated from the first conducting line (27);

said strip element (60) establishing an electric contact between said second conducting line (23) and said second collector means (45) at the portions of said strip element (60) in said lowered rest position; and said electric contact portion (71) establishing an electric bridge contact between said first conducting line (27) and said first collector means (51) at the portions of said strip element (60) in said raised electric contact position.

8. A line as claimed in claim 7, characterized in that said first collector means (51) and said second collector means (45) comprise conducting portions housed in said cavity (6, 18) and facing each other on opposite sides of the cavity (6, 18);

said first conducting line (27) and said second conducting line (23) comprising respective elongated conducting portions (27a, 20a) housed facing each other inside said cavity (6, 18) and extending substantially the whole length of said enclosure (4);

said electric contact portion (71) facing said first collector means (51) and said first conducting line (27); and said striplike base portion (63) facing said second collector means (45) and said second conducting line (23);

at least one said conducting bridge element (73) establishing an electric connection between said first conducting line (27) and at least one first collector means (51) at the portions of said electric contact portion (71) in said raised electric contact position.

9. A line as claimed in claim 8, characterized in that said first conducting line (27) comprises a contact portion (27a) substantially coplanar with a contact portion (51) of said first collector means (51);

each said conducting bridge element (73) being of a width (L) greater than a distance (d) between adjacent edges (51b, 27b) of said contact portions of said first collector means (51) and said first conducting line (27);

at least one said conducting bridge element (73) being interposed, at the portion of said electric contact portion (71) in said raised electric contact position, between said contact portion of the first collector means (51) and the contact portion of the first conducting line (27) to establish said electric connection.

10. A line as claimed in claim 7, characterized in that said striplike base portion (63) also carries a number of electric contact elements (69), which are spaced along the strip element (60) and are detached from the striplike base portion (63) in a direction crosswise to the strip element (60); each said electric contact element (69) establishing an electric bridge contact between said second conducting line (23) and said second collector means (45) at the portions of the strip element (60) in said lowered rest position in which the strip element (60) extends substantially undeformed.

11. A line as claimed in claim 10, characterized in that adjacent, ones of said electric contact elements (69) are spaced along said strip element (60) with a spacing (D) substantially equal to a distance between corresponding portions of adjacent ones of said second collector means (45), so that each said electric contact element (69) establishes an electric bridge contact between said second conducting line (23) and said second collector means (45) at the portions of the strip element (60) in said lowered rest position.

12. A line as claimed in claim 10, characterized in that said second conducting line (23) comprises a contact portion (20a) substantially coplanar with a contact portion of said second collector means (45);

said electric contact elements (69) being of a length greater than a distance (d) between adjacent edges (45b, 20b) of said contact portions of said second collector means (45) and said second conducting line (23);

each said electric contact element (69) being positioned, at the portion of said strip element in said lowered rest position, with opposite end portions contacting said contact portion of the second collector means (45) and said contact portion (20a) of the second conducting line (23).

13. A line as claimed in claim 10, characterized in that each said electric contact element (69) is connected to a respective flexible supporting device carried by said striplike base portion (63) to enable the electric contact element (69) to be positioned with respect to said strip element (60).

14. A line as claimed in any claim 13, characterized by comprising safety switching means (200) interposed between an output of a voltage source (202) and said first (27) and second (23) conducting lines;

said safety switching means (200) separating said voltage source (202) from the power line (1) in an event of high current absorption as a result of said short-circuit.

* * * * *